United States Patent
Coulomb et al.

(10) Patent No.: US 7,380,211 B2
(45) Date of Patent: May 27, 2008

(54) SYSTEM AND METHOD TO MANAGE SPEAKER NOTES IN A COMPUTER IMPLEMENTED SLIDE SHOW

(75) Inventors: Beatrice Coulomb, Cagnes sur Mer (FR); Olivier Foncarnier, La Colle sur Loup (FR); Carole Truntschka, Saint-Laurent-Du-Var (FR)

(73) Assignee: International Business Machines Corporation, Armonk, NY (US)

( * ) Notice: Subject to any disclaimer, the term of this patent is extended or adjusted under 35 U.S.C. 154(b) by 528 days.

(21) Appl. No.: 11/065,385

(22) Filed: Feb. 24, 2005

(65) Prior Publication Data

US 2005/0193323 A1 Sep. 1, 2005

(30) Foreign Application Priority Data

Feb. 27, 2004 (EP) .................................. 04368015

(51) Int. Cl.
*G06F 3/00* (2006.01)
(52) U.S. Cl. ...................................... 715/730; 715/732
(58) Field of Classification Search ................ 715/730, 715/708, 714, 731, 732
See application file for complete search history.

(56) References Cited

U.S. PATENT DOCUMENTS

| | | | | |
|---|---|---|---|---|
| 5,859,974 A | * | 1/1999 | McArdle et al. ............ | 709/204 |
| 5,917,480 A | * | 6/1999 | Tafoya et al. ............... | 715/732 |
| 6,819,338 B2 | * | 11/2004 | Heasman et al. ........... | 715/730 |
| 6,943,752 B2 | * | 9/2005 | Masumoto et al. .......... | 345/1.1 |
| 7,246,316 B2 | * | 7/2007 | Furlong et al. ............. | 715/730 |
| 2002/0191013 A1 | * | 12/2002 | Abrams ...................... | 345/730 |
| 2003/0222890 A1 | * | 12/2003 | Salesin et al. .............. | 345/629 |
| 2003/0222900 A1 | * | 12/2003 | Schramm-Apple et al. . | 345/730 |
| 2005/0099432 A1 | * | 5/2005 | Chavis et al. ............... | 345/619 |

* cited by examiner

*Primary Examiner*—Sy Luu
*Assistant Examiner*—Anil N Kumar
(74) *Attorney, Agent, or Firm*—Norman L. Gundel; Hoffman, Warnick & D'Alessandro LLC

(57) ABSTRACT

A system and method for managing speaker notes in a slide presentation is disclosed. Preferably, the invention operates in a computer implemented slide presentation product. Particularly, a system for creating a plurality of speaker notes files to be used in support of a slide presentation comprises means for creating a first speaker notes file including a first speaker notes instance to be used in support of one slide of the slide presentation and means for creating at least a second speaker notes file including a second speaker notes instance. Links are created between the slide presentation and the at least second speaker notes file to allow the at least second speaker notes instance to be used in support of the one slide.

13 Claims, 6 Drawing Sheets

SYSTEM AND METHOD TO MANAGE SPEAKER NOTES IN A COMPUTER IMPLEMENTED SLIDE SHOW

BACKGROUND OF THE INVENTION

1. Technical Field

The present invention relates generally to slide show programs, and more particularly to a system and method to improve the management of speaker notes for such programs.

2. Related Art

Slide show programs have been developed to help a user in creating, editing, developing and managing slide presentations on a computer. Generally, a slide show contains several electronic slides that display information to an audience. Each slide may be presented as a screen or a page output. Moreover, each slide show may contain one or more objects, such as text, graphical images, animation or sound. A slide may also include text usually defined as "speaker notes," developed by or for the speaker in order to give written support during the presentation.

To initiate a presentation, a user calls the "slide show" functionality to sequentially display the slides contained in the presentation on a computer display or to project it on any other surface. During this operation, the user controls the progress of the presentation by invoking a command to "go to the next slide" and may comment on each current slide, having the respective text of the speaker notes available for support.

Typically, a speaker uses the same slide presentation for a specific audience, using speaker notes only for his personal purposes and providing to participants a set of electronic slides without those speaker notes.

It may also be convenient to have one slide presentation shared between different speakers not having the same native language and thus to have a set of the same speaker notes in different languages.

In present products, a user has to manually manage speaker notes, and when needed, to manually modify the speaker notes associated with each slide of a presentation. The user has to save multiple versions of the slide presentation, and has to edit the speaker notes of a specific slide in each version and modify or remove text, or translate it as required.

The above manual processing presents important drawbacks. The main drawback is that the manual action is performed in a repetitive manner and thus is open to human errors, such as keeping undesirable speaker notes, for example. Another drawback is that the author of the presentation file must manually manage several versions of the same presentation, and the size of the basic presentation file is multiplied by the number of versions on his computer hard disk.

No solution exists to automatically manage a set of speaker notes related to a single slide presentation.

SUMMARY OF THE INVENTION

Accordingly, one object of the invention is to achieve a method and to provide a system for managing in an efficient way a plurality of speaker notes files to be linked to one slide presentation.

Preferably, the invention operates in a computer implemented slide presentation product. Particularly, a system for creating a plurality of speaker notes files to be used in support of a slide presentation comprises means for creating a first speaker notes file including a first speaker notes instance to be used in support of one slide of the slide presentation and means for creating at least a second speaker notes file including a second speaker notes instance. Links are created between the slide presentation and the at least second speaker notes file to allow the at least second speaker notes instance to be used in support of the one slide.

More generally, a system for managing speaker notes files of a slide presentation program is proposed and comprises:
a) a computer having a slide presentation program executing thereon;
b) a slide presentation created with the slide presentation program, the slide presentation comprising at least one slide and a speaker notes instance created under control of the slide presentation program and to be used in support of the at least one slide; and
c) computer readable program means executable by the computer for performing actions, including:
(i) creating speaker notes files, each speaker notes file including at least one speaker notes instance to be used in support of the at least one slide; and
(ii) linking the at least one speaker notes instance of each speaker notes file to the at least one slide.

In a commercial form, the computer readable program means is embodied on a program storage device that is readable by a computer machine.

BRIEF DESCRIPTION OF THE DRAWINGS

The above and other objects, features and advantages of the invention will be better understood by reading the following more particular description of the invention in conjunction with the accompanying drawings wherein:

FIG. 1-*b* is a detailed view of a set of speaker notes files linked to a slide presentation.

DETAILED DESCRIPTION OF THE INVENTION

Figure 1A:
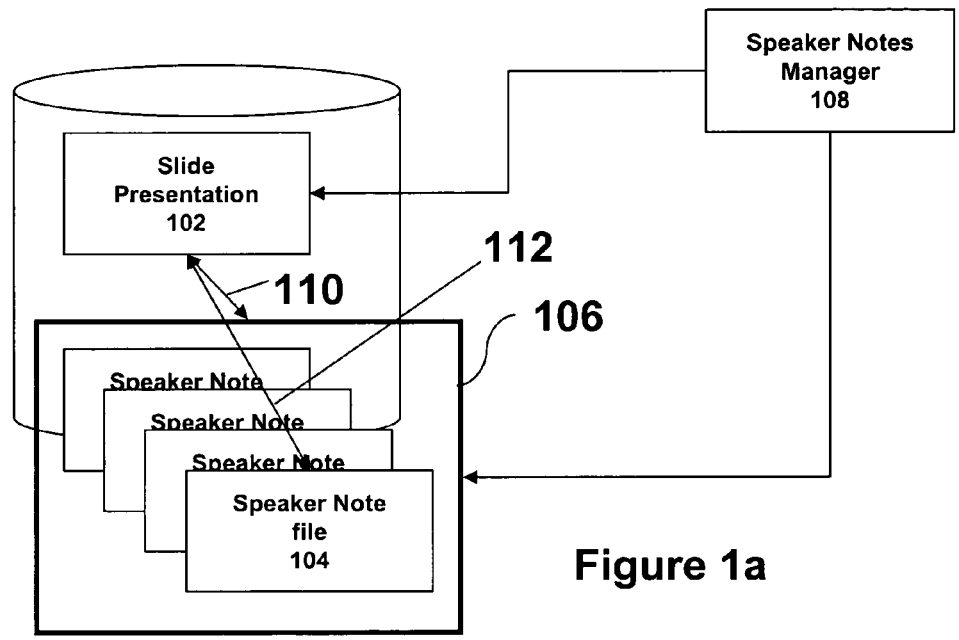
FIG. 1-*a* is a general conceptual view of the system of the present invention.
Figure 1B:
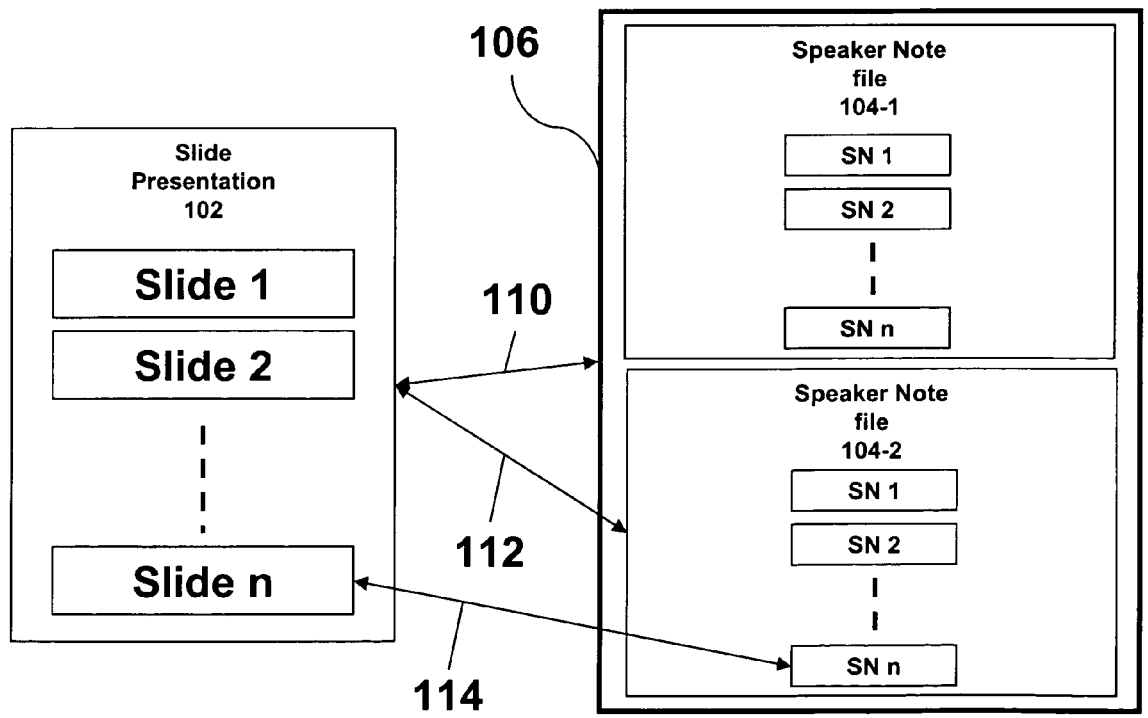

A system according to the invention is illustrated in FIG. 1-*a*. System 100 comprises a slide presentation component 102, a plurality of speaker notes components 106, and a speaker notes manager component 108. Speaker notes component 106 may comprise one 104 or a plurality (104-1 to 104-*n*) of speaker notes files. The speaker notes manager 108 operates to maintain a file link between one speaker notes file 104 and the slide presentation component 102 as illustrated with arrow 112. Moreover, speaker notes manager 108 also operates to maintain a bundle link 110 between the slide presentation component 102 and a plurality of the speaker notes files grouped in a speaker notes component 106.

Each component of system 100 is now detailed, and firstly it is to be noted that the slide presentation component 102 may be a slide presentation created and/or modified and/or displayed by/with a slide presentation product, such as the well-known PowerPoint from Microsoft, Freelance from Lotus Corporation, or StarOffice from Sun.

The speaker notes manager 108 is a routine which allows the global management of a speaker notes file 104, and maintains dynamically the file link 112 between the slide presentation component 102 and the speaker notes file 104. It is to be appreciated that the speaker notes file 104 is created via a speaker notes function generally provided by the slide presentation program currently used.

The speaker notes manager 108 routine also allows the management of a plurality of speaker notes components 106-*i* each of which groups a plurality of speaker notes files 104-*i*, and thereby also maintains dynamically a bundle link 110 between the slide presentation component 102 and the bundle of speaker notes files.

Finally, the speaker notes manager 108 routine also allows the management of slide-by-slide links 114, between each slide of the slide presentation component 102 and the corresponding speaker notes instance of a speaker notes file 104-*i*.

A more detailed view of these links is shown on FIG. 1-*b*.

The skilled person will easily appreciate that a plurality and a variety of functions may be performed via the speaker notes manager 108. For example, file link 112 may be changed from one speaker notes instance 104-*i* of speaker notes file 104 to another instance 104-*j* as it will be more detailed later with reference to FIG. 4. Another example is that bundle link 110 may be changed from one instance 106-*i* of speaker notes component 106 to another instance 106-*j* or may be deleted as it will be more detailed later with reference to FIG. 6.

Figure 2:
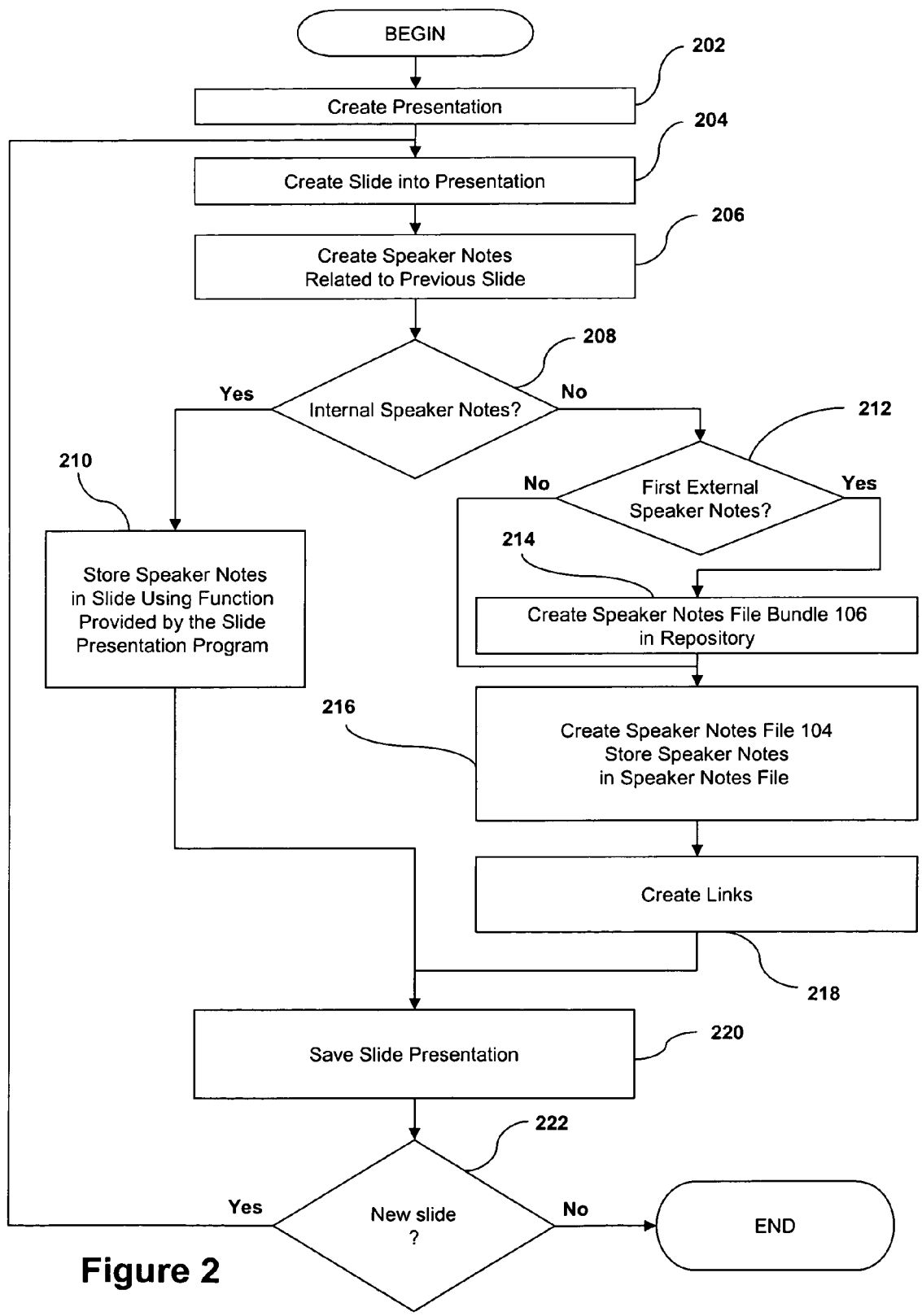
FIG. 2 is a flow chart of the main steps to create a slide presentation along with a speaker notes file as defined by the present invention.

Referring now to FIG. 2, the main steps to create a slide presentation along with speaker notes as defined by the present invention is described.

The process starts on step 202 with the creation of a slide presentation. Next step 204 allows the creation of the first slide of the presentation. While it is not deeply described, it is to be appreciated that the creation may be performed using common slide presentation programs as already mentioned. On next step 206, the process allows the user to access and create a speaker notes instance related to the previously created slide.

Next step 208 allows the user either to declare the speaker notes instance internally into the presentation or to create an external set of speaker notes files to be linked to the presentation. If the user selects to have the speaker notes instance in the presentation (branch Yes), then the speaker notes instance is stored into the slide presentation as part of the slide presentation menu on step 210, and the presentation is saved on step 220. On a next step 222, the user is asked for the creation of a new slide. If the answer is Yes the process goes back to step 204 otherwise the process ends.

If on step 208 the user selects to create the speaker notes instance as an external file (branch No), the process goes to step 212, where it is checked if it is a first slide creation or not. If the speaker notes instance previously created is the first external speaker notes (branch Yes), then the process creates on step 214 a bundle of speaker notes files in a repository of the computer system. If it is not the first created one (branch No), the process then creates a new external file on step 216 and updates it with the speaker notes instance defined by the user. The various links, bundle link 110 (between the slide presentation component 102 and the bundle of speaker notes files 106), file link 112 (between the slide presentation component 102 and the speaker notes file 104) and slide-by-slide link 114 (each link between the slides of the slide presentation 102 and each speaker notes instance of the speaker notes file 104) are created on step 218.

Next, on step 220, the slide presentation is saved. On step 222, if the user wants to create a new slide, the process loops back to step 204, else the process ends.

Figure 3:
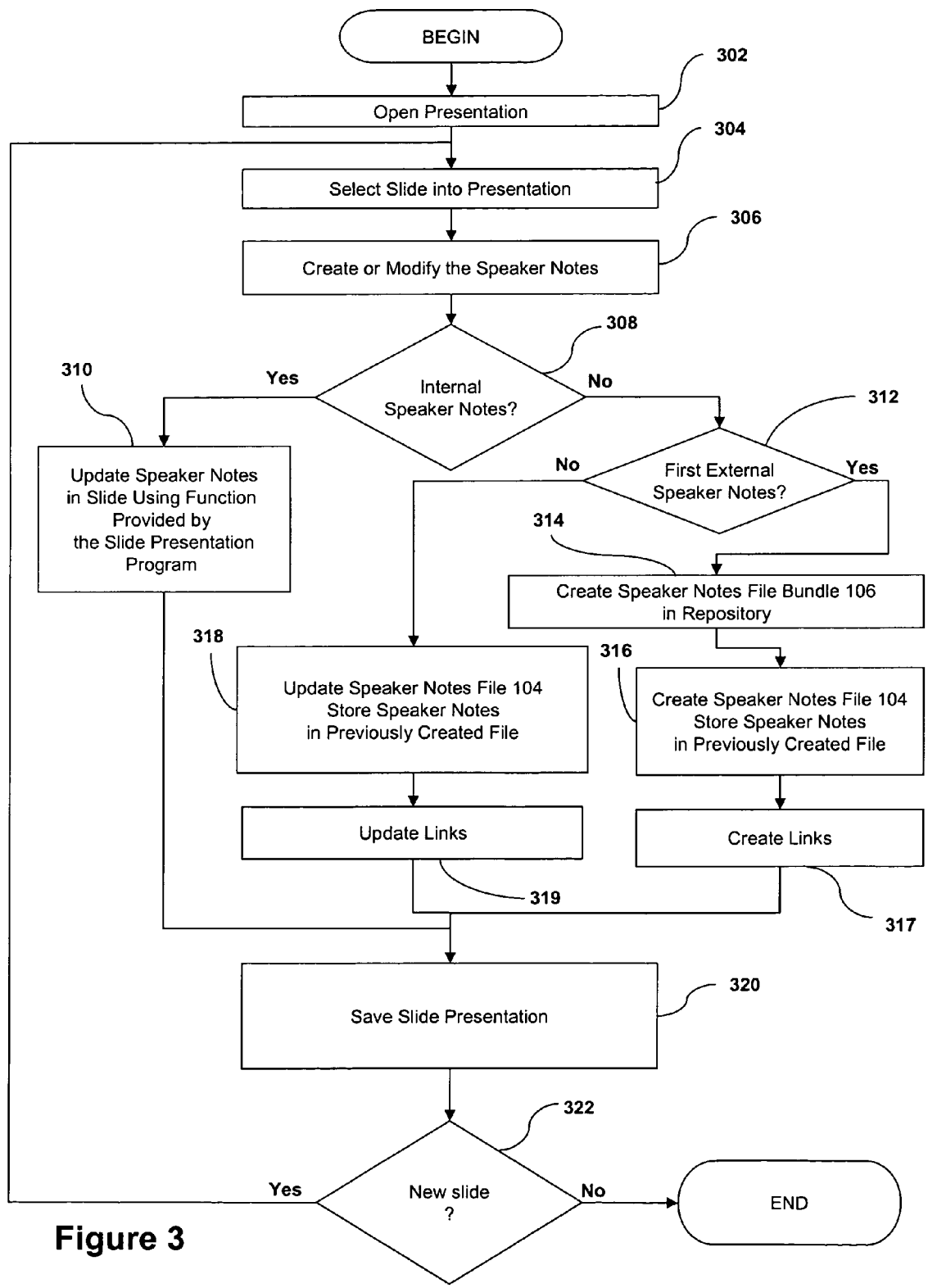
FIG. 3 is a flow chart of the main steps to modify a speaker notes file within a slide presentation as defined by the present invention.

Referring now to FIG. 3, the main steps to modify a speaker notes instance in a slide presentation as defined by the present invention are described.

The process starts on step 302 with the editing of a slide presentation and the editing of one specific slide among the plurality of slides of the presentation on step 304. Again, while it is not deeply described, it is to be appreciated that the edition may be performed using common slide presentation programs as previously mentioned.

Step 306 allows the user to select a create/modify function using the default speaker notes interface provided by the slide presentation product in use.

Step 308 checks whether the speaker notes instance selected by the user is internal or external to the current slide presentation. If the speaker notes instance is internal, then it is updated with the appropriate modifications (step 310) and saved into the slide presentation as part of the slide presentation menu on step 320.

If the speaker notes instance is not internal, the process goes to step 312.

Step 312 checks if the speaker notes instance is the first external instance (the slide presentation file 102 was defined previously without speaker notes). If Yes, the process creates on step 314 a speaker notes file bundle in a computer system repository and then on step 316 creates a speaker notes file 104 and stores it with the speaker notes file defined by the user. All links, bundle link 110, file link 112 and slide-by-slide link 114 are created on step 317.

If the user is not creating a first speaker notes instance on step 312 (branch No), the process updates the existing external speaker notes file on step 318 with the modifications defined by the user and then updates a slide-by-slide link 114 on step 319.

Next, on step 320, the updated slide presentation is saved with the new speaker notes instance. If on step 322 the user wants to update a new slide (branch Yes), the process loops back to step 304 otherwise (branch No) the process ends.

Figure 4:
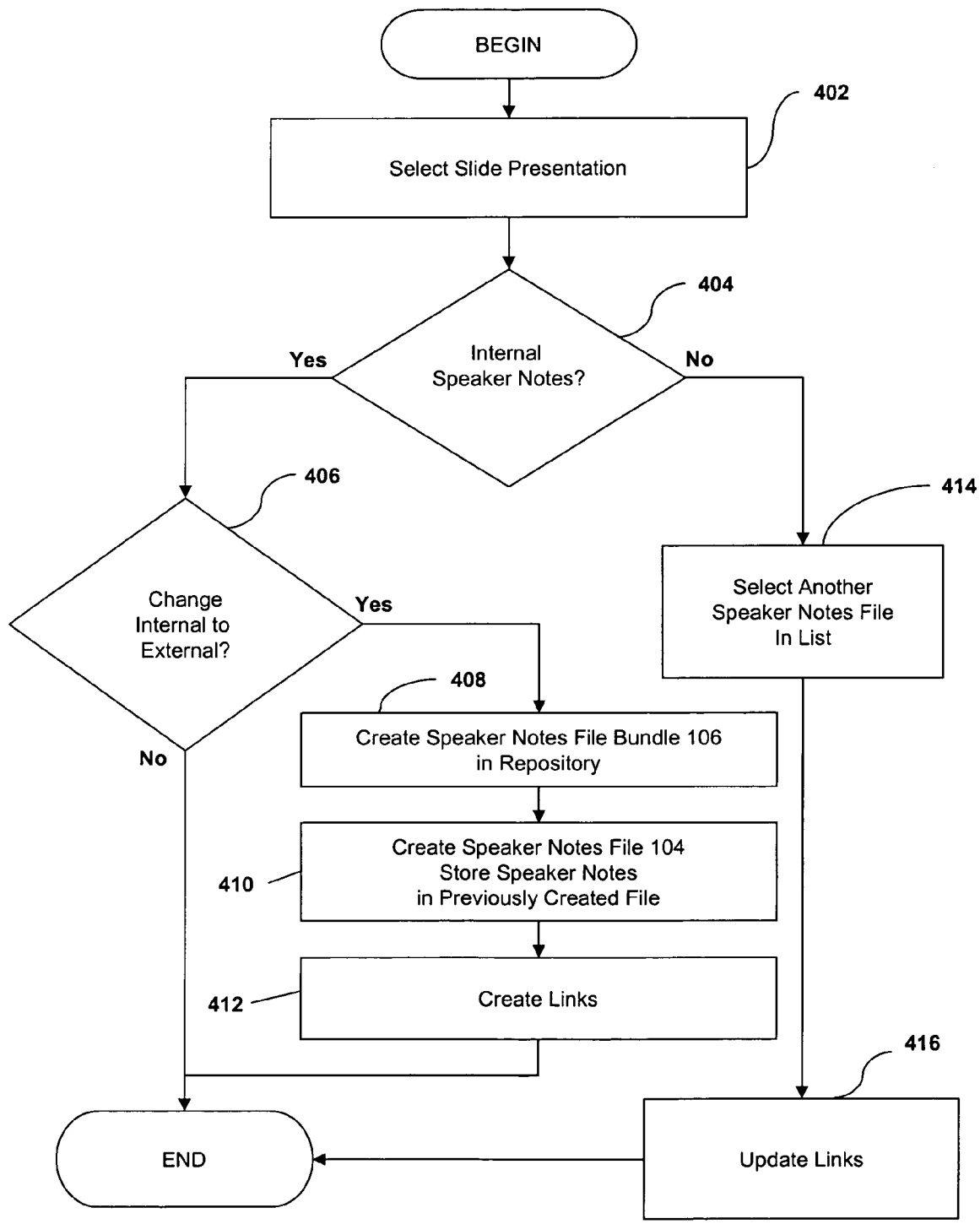
FIG. 4 is a flow chart of the main steps to use the speaker notes manager to link a slide presentation file to a set of speaker notes files as defined by the present invention.

Referring now to FIG. 4, the main steps to use the speaker notes manager 108 to link a slide presentation file to a speaker notes file as defined by the present invention are described.

The process starts on step 402, with the selection of a slide presentation. The user selects the appropriate slide presentation preferably through a speaker notes manager graphical user interface as it is for example illustrated on FIG. 5.

Step 404 checks if the selected slide presentation is already associated with an internal set of speaker notes. If it is not the case (branch No), which means that the slide presentation is associated with an external set of speaker notes, then the user is able to select another speaker notes file 104-*i* on step 414 (in the bundle of the speaker notes linked to the slide presentation 102), and on next step 416 the previous file link 112 is deleted and a new file link 112 is created. During the same step, the existing slide-by-slide links 114 are replaced by new ones, based on the new speaker notes file 104-*i* selected. The process then ends.

Back to step 404, if the slide presentation is associated with an internal set of speaker notes files (branch Yes), the process allows the user (on step 406) either to keep this configuration (branch No) and the process ends, or to create a set of speaker notes file in a computer system repository (step 408). Next, a speaker notes file based on the internal existing speaker notes is created and saved in step 410. On step 412, all links, bundle link 110 (between slide presentation 102 and the bundle of speaker notes files 106), file link 112 (between slide presentation 102 and speaker notes file 104) and slide-by-slide 114 (each link between the slides from slide presentation 102 to each speaker notes instance of speaker notes file 104) are created. Then, the process ends.

Figure 5:
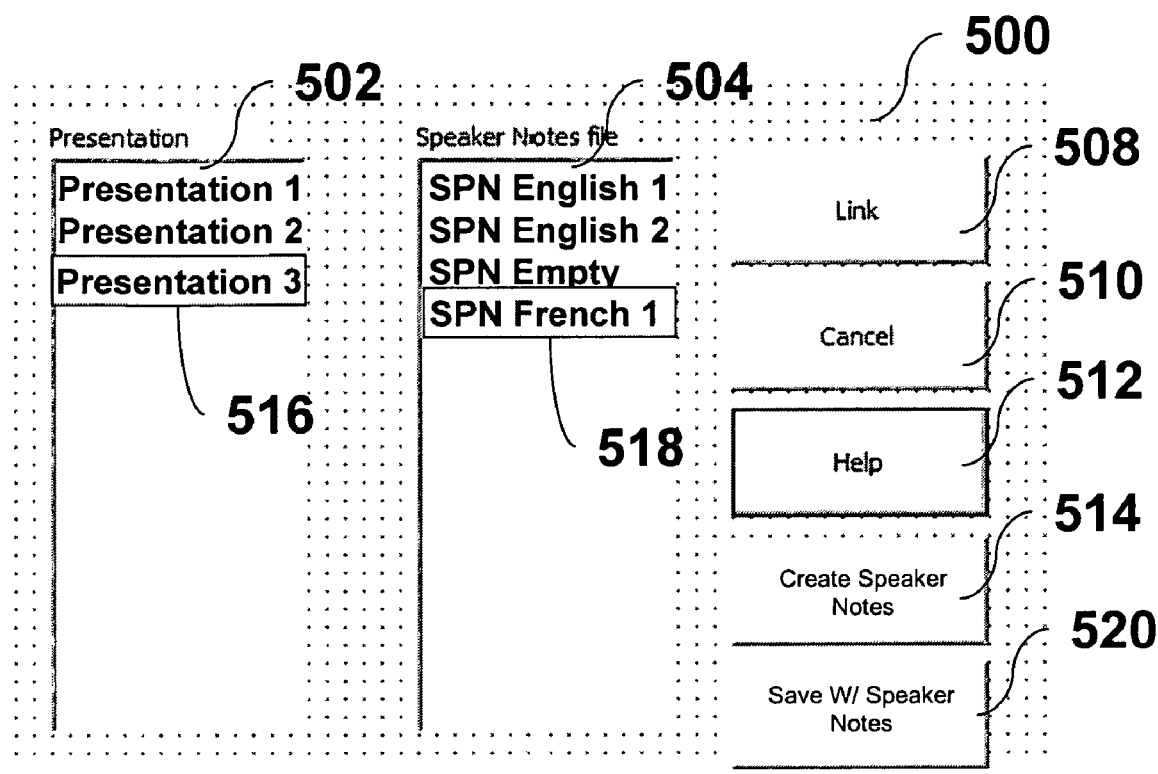
FIG. 5 is a pictorial representation of the speaker notes manager main window in a preferred embodiment.

FIG. 5 illustrates a preferred embodiment of the speaker notes manager main window 500. This window is displayed in response to a speaker notes manager start action. The window includes a slide presentation area 502 to display a list of the slide presentation files available for the user either locally or on a remote linked computer. The user may select one slide presentation 516 in this selection list 502.

The main window also includes a speaker notes area 504 listing all the speaker notes files available to be linked to the presentation selected into the presentation list 502. The speaker notes file selected 518 in the speaker notes list 504 is the one linked to the selected presentation 516.

The main window 500 also includes several push buttons. A Link push button 508 allows the user to create the previously described links.

A Cancel push button 510 allows to cancel all actions while maintaining the existing links that have been defined before the speaker notes manager start.

The main window may also include a Help push button 512 to start a help process for the speaker notes manager.

If the user selects a slide presentation 516 in the presentation selection list 502 that has embedded speaker notes and then clicks on push button 514 "Create Speaker Notes," the process creates the speaker notes file bundle in the computer system repository, then creates an external speaker notes file and updates it with the speaker notes defined by the user. All links, bundle link 110, file link 112 and slide-by-slide link 114 are then created as described in FIG. 4, and the speaker notes file 518 is added to the speaker notes list 504 and highlighted.

If the user selects a slide presentation 516 in the presentation selection list 502 and clicks on a push button "Save W/Speaker Notes" 520, a slide presentation 516 is saved without any speaker notes embedded or the existing bundle link 110 is moved to an empty speaker notes file.

Figure 6:
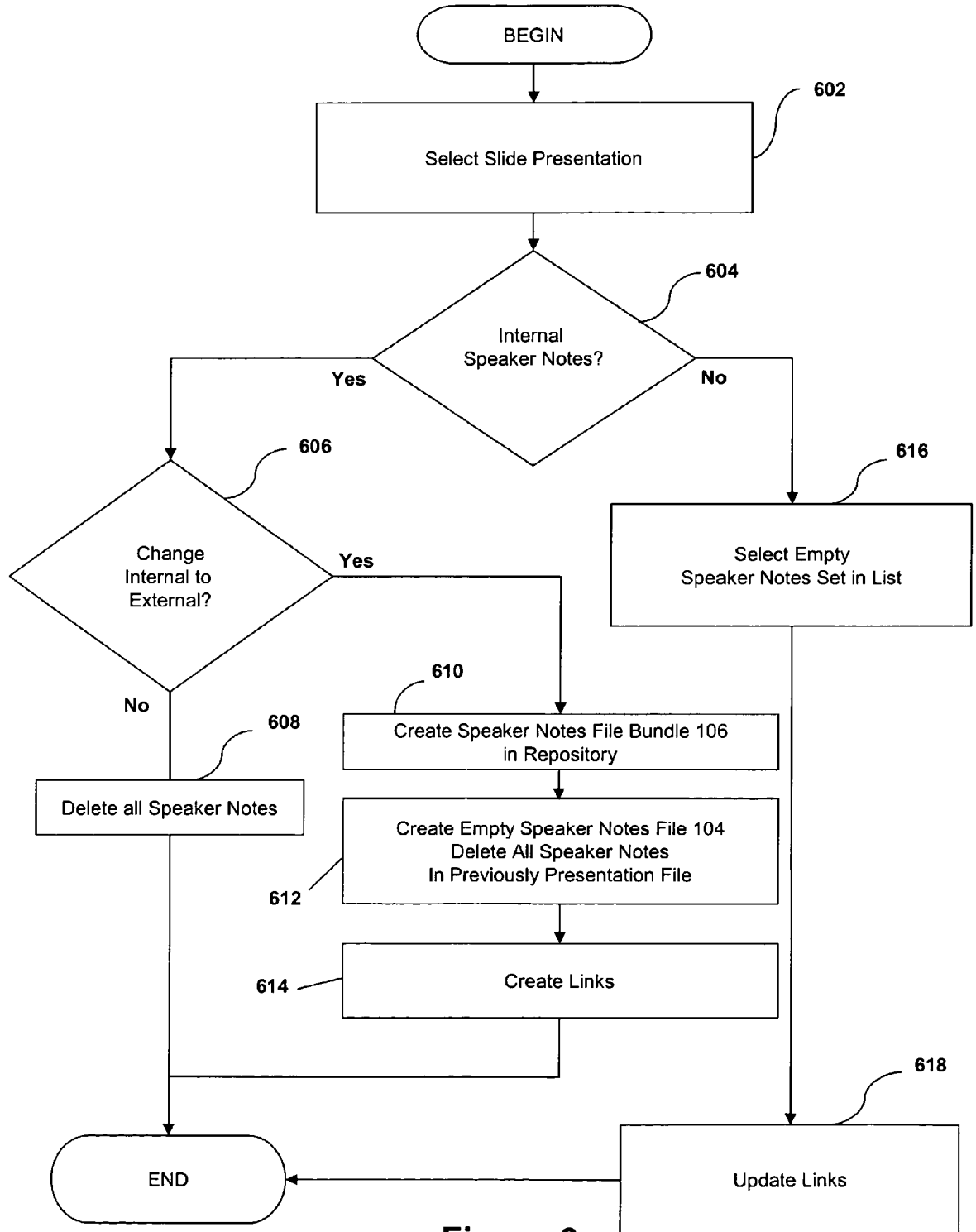
FIG. 6 is a flow chart of the main steps to save a slide presentation file without speaker notes files as defined by the present invention.

Referring now to FIG. 6, the main steps to save a slide presentation without speaker notes file associated are described. The process starts on step 602, with the user selecting a slide presentation through the speaker notes manager main window 500 and clicking on the "Save W/Speaker Notes" button 520, as previously described with reference to FIG. 5.

Step 604 checks if the slide presentation is already associated with an internal set of speaker notes. If it is not the case (branch No), the process allows to select on step 616 an empty speaker notes file included in the external set of speaker notes files or to create a new empty one if it does not exist previously. On step 618, the file link 112 and the slide-by-slide links 114 are updated by first deleting the previously defined ones and creating new ones. Then the process ends.

Back to step 604, if the slide presentation is not associated with an external set of speaker notes (branch Yes), the process allows the user (on step 606) either to keep the internal configuration (branch No) or to create a bundle of speaker notes files in a computer system repository (branch Yes).

If the user wants to keep the internal speaker notes files, the process on step 608 deletes automatically all speaker notes files from the presentation file 102, and the process ends.

If the user chooses to change the internal speaker notes files, the process allows to create a bundle of speaker notes file in a computer system repository (step 610).

On next step 612, an empty speaker notes file is created and all speaker notes files are automatically deleted from the presentation File 102.

Then on step 614, all links, bundle link 110 (between slide presentation 102 and the bundle of speaker notes files 106), file link 112 (between slide presentation 102 and the speaker notes file 104) and slide-by-slide link 114 (each link between the slides of slide presentation 102 and each empty speaker notes instance from speaker notes file 104) are created. And the process ends.

Finally, it is to be appreciated that the present invention offers an easy and efficient solution to have a plurality of speaker notes files linked to a single slide presentation.

The invention claimed is:

1. In a computer implemented slide presentation product, a system for creating a plurality of speaker notes files to be used in support of a slide presentation, comprising:

means for creating a first speaker notes file including a first plurality of speaker notes instances to be used each respectfully in support of one slide among a plurality of slides of the slide presentation;

means for creating a second speaker notes file including a second plurality of speaker notes instances to be used each respectfully in support of one slide among the plurality of slides of the slide presentation, wherein the first and second speaker notes files are grouped in a speaker notes component; and means for creating links between the slide presentation and the first or second speaker notes file to allow a respective first or second speaker notes instance to be used in support of the one slide;

wherein the links comprise a bundle link between the slide presentation and the speaker notes component, a file link between the slide presentation and a selected one of the first or second speaker notes files; and a plurality of slide-by-slide links between each of the plurality of slides of the slide presentation and a respective speaker notes instance in the selected speaker notes file.

2. The system of claim 1 wherein the means for creating the second speaker notes file further comprises means for modifying the second speaker notes file.

3. The system of claim 1 wherein the means for creating the second speaker notes file further comprises means for creating an empty speaker notes file.

4. The system of claim 1 further comprising storing means for storing the second speaker notes file, and wherein the means for creating links further comprises means for creating a link between the storing means and the slide presentation.

5. The system of claim 1 further comprising a computer display and Graphical User Interface means for emulating the slide presentation product.

6. The system of claim 5 wherein the Graphical User Interface means comprises a dedicated create push button for creating the second speaker notes file.

7. The system of claim 5 wherein the Graphical User Interface means comprises a dedicated link push button for creating links between the slide presentation and the second speaker notes file.

8. The system of claim 5 wherein the Graphical User Interface means comprises a dedicated save push button for storing the second speaker notes file.

9. The system of claim 1 wherein the means for creating a first speaker notes file, the means for creating a second speaker notes file and the means for creating links are computer readable program means executable by a computer machine.

10. A program storage device readable by a computer machine, tangibly embodying the computer readable program means of claim 9.

11. A system for managing speaker notes files of a slide presentation program comprising:
  (a) a computer having a slide presentation program executing thereon;
  (b) a slide presentation created with the slide presentation program, the slide presentation comprising at least one slide and a speaker notes instance created under control of the slide presentation program and to be used in support of the at least one slide; and
  (c) computer readable program means executable by the computer for performing actions, including:
  (i) creating speaker notes files, each speaker notes file including at least one speaker notes instance to be used in support of the at least one slide, wherein the speaker notes files are grouped in a speaker notes component; and
  (ii) linking the at least one speaker notes instance of each file to the at least one slide wherein the linking comprises a bundle link between the slide presentation and the speaker notes component, a file link between the slide presentation and a selected one of the speaker notes files; and at least one slide-by-slide link between each of the at least one slide of the slide presentation and a respective speaker notes instance in the selected speaker notes file.

12. The system of claim 11 wherein the computer readable program means further perform storing or deleting of speaker notes files.

13. The system of claim 12 wherein the computer readable program means is embodied on a program storage device readable by a computer machine.

* * * * *